US011938489B2

(12) United States Patent
Johansen et al.

(10) Patent No.: US 11,938,489 B2
(45) Date of Patent: Mar. 26, 2024

(54) CENTRIFUGAL SEPARATOR HAVING AN IMPROVED FLOW AND SYSTEM COMPRISING SUCH A CENTRIFUGAL SEPARATOR

(71) Applicant: FLSmidth A/S, Valby (DK)

(72) Inventors: Johnny Johansen, Copenhagen (DK); Jesper Gerdes Kyhnauv, Copenhagen (DK); Tod Nikischer, Vancouver (CA)

(73) Assignee: FLSmidth A/S (DK)

( * ) Notice: Subject to any disclaimer, the term of this patent is extended or adjusted under 35 U.S.C. 154(b) by 113 days.

(21) Appl. No.: 17/762,725

(22) PCT Filed: Nov. 11, 2020

(86) PCT No.: PCT/EP2020/081783
§ 371 (c)(1),
(2) Date: Mar. 22, 2022

(87) PCT Pub. No.: WO2021/094386
PCT Pub. Date: May 20, 2021

(65) Prior Publication Data

US 2022/0339640 A1 Oct. 27, 2022

(30) Foreign Application Priority Data

Nov. 13, 2019 (DK) .......................... PA 2019 01328

(51) Int. Cl.
*B04B 1/08* (2006.01)
*B03B 5/32* (2006.01)
*B04B 7/08* (2006.01)

(52) U.S. Cl.
CPC .................. *B03B 5/32* (2013.01); *B04B 1/08* (2013.01); *B04B 7/08* (2013.01)

(58) Field of Classification Search
CPC .. B04B 1/08; B04B 7/08; B04B 15/12; B03B 5/32; B03B 1/00; B03B 1/02; B03B 1/04
(Continued)

(56) References Cited

U.S. PATENT DOCUMENTS 881,013 A 3/1908 Manley
1,473,421 A 11/1923 Eccleston
(Continued)

FOREIGN PATENT DOCUMENTS

AU 17487/34 6/1935
AU 22055/35 4/1936
(Continued)

OTHER PUBLICATIONS

"Development of the Falcon Concentrator" S.A. McAlister and K.C. Armstrong Falcon Concentrators Inc.—SME Annual Meeting Presentation Orlando, Florida Mar. 9-11, 1998.
(Continued)

*Primary Examiner* — Michael McCullough
*Assistant Examiner* — Jessica L Burkman
(74) *Attorney, Agent, or Firm* — Jeffrey A. Sharp

(57) ABSTRACT

A centrifuge (1) for separating intermixed particulate material of different specific gravity. The centrifuge (1) comprising a centrifuge bowl (10) having a plurality of annular recesses (19), a housing (30), an inlet (17), and means for rotating the centrifuge bowl (10) about the central axis (15). An annular cavity (31) is defined between the housing (30) and the centrifuge bowl (10). The annular cavity (31) is fluidly connected to the plurality of annular recesses (19) on the inner surface of the centrifuge bowl by a number of perforations in the centrifuge bowl wall (12). The annular cavity (19) has a fluid inlet to provide fluid into the annular cavity. The annular cavity (19) has an accumulated cross-
(Continued)

sectional flow area ($A_{flow}$) at two different heights in the annular cavity that differs by at least a factor 10.

17 Claims, 9 Drawing Sheets

(58) Field of Classification Search
USPC ........................................................... 209/17
See application file for complete search history.

(56) References Cited

U.S. PATENT DOCUMENTS

| | | | |
|---|---|---|---|
| 1,658,874 A | 2/1928 | Ainlay | |
| 1,853,249 A | 4/1932 | Ainlay | |
| 1,954,676 A | 4/1934 | Lindberg | |
| 2,022,926 A | 12/1935 | Schlank | |
| 2,161,476 A | 6/1939 | Leja | |
| 2,227,267 A | 2/1942 | Knudsen | |
| 2,272,675 A | 2/1942 | Knudsen | |
| 4,608,040 A | 8/1986 | Knelson | |
| 4,799,920 A | 1/1989 | Mozley | |
| 4,846,781 A * | 7/1989 | Knelson | B04B 1/00 494/60 |
| 4,964,845 A | 10/1990 | Mozley | |
| 4,983,156 A | 1/1991 | Knelson | |
| 6,095,965 A | 8/2000 | Eiderman et al. | |
| 7,500,943 B1 | 3/2009 | Peacocke et al. | |
| 7,503,888 B1 | 3/2009 | Peacocke et al. | |
| 2018/0304277 A1 | 10/2018 | Heinrichs et al. | |
| 2022/0226836 A1 | 7/2022 | Gillis | |

FOREIGN PATENT DOCUMENTS

| | | |
|---|---|---|
| AU | 652708 B2 | 9/1994 |
| BR | 0400891-0 A | 1/2005 |
| DK | 180398 B1 | 3/2021 |
| DK | 201901328 A1 | 3/2021 |
| RU | 2066565 C1 | 9/1996 |
| RU | 2136373 C1 | 9/1999 |
| RU | 2151642 C1 | 6/2000 |
| RU | 2529350 C1 | 9/2014 |
| RU | 2775527 C1 | 4/2022 |
| RU | 2775528 C1 | 4/2022 |
| SU | 1296226 A1 | 3/1987 |
| WO | 2006111008 A1 | 10/2006 |
| WO | 2011/011862 A1 | 2/2011 |
| WO | 2019144179 A1 | 8/2019 |
| WO | 2022160010 A1 | 8/2022 |
| WO | 2022197217 A1 | 9/2022 |

OTHER PUBLICATIONS

The International Search Report and Written Opinion dated Feb. 1, 2021, 13 pages.

* cited by examiner

CENTRIFUGAL SEPARATOR HAVING AN IMPROVED FLOW AND SYSTEM COMPRISING SUCH A CENTRIFUGAL SEPARATOR

FIELD OF INVENTION

The present invention relates to a centrifugal separator of the type having a plurality of axially spaced annular recesses on a peripheral wall of a rotatable bowl.

BACKGROUND

Different arrangements of centrifugal separators of the type including a rotatable bowl having a peripheral wall comprising annular recesses has been known in the industry for many years.

The peripheral wall typically has a frusto-conical shape meaning that it has a slight inclination with respect to a vertical axis. Particulate material containing fractions of different specific gravity to be separated is fed in slurry form through a feed duct to a position at or near the bottom part of the bowl. As the bowl is rotated at high speeds the feed materials flow towards and along the peripheral wall and are allowed to pass over the recesses. Typically, water is injected from the outer side of the peripherical wall though holes into the annular recesses to fluidize the collected material. Heavier particulate materials (the product) collects in the annular recesses while lighter particulate materials flow over the annular recesses and escape from the bowl through a top opening in the bowl.

Attempts have been made to increase the efficiency of this type of separator by changing the shape of the recesses, or provide inserts or screens into the recesses. However, despite many attempts to improve this type of centrifugal separator over the years, the unit recovery is still only at around 20% and the slurry that exits the bowl is therefore passed through several separators to obtain as much product as possible.

Since the type of materials to be separated and the density of those materials in the slurry may vary, the operational conditions of the individual separator should be optimized. In this context it is possible to vary rotational speed, i.e. centrifugal force and the water injection pressure. Both control the fluidization in the annular recesses and determines the density of the particles which collect. It is however desirable to provide a concentrator design which allow for improved flexibility and optimization.

It is also desirable to provide a centrifugal separator which is able to provide a higher yield i.e. a product stream with a higher concentration of the product. This would enable a similar yield to the current centrifugal separators with fewer passes through a separator, or preferably a higher yield with the same number of separation steps.

SUMMARY OF THE INVENTION

With this background, it is therefore an object of the present invention to provide a centrifuge, by which it is possible to mitigate some of the drawbacks of the prior art. In a first aspect of the invention, these and further objects are obtained by a centrifuge for separating intermixed particulate material of different specific gravity comprising

- a centrifuge bowl having a base, a circumferential wall surrounding a central axis and an open end substantially opposite of the base, said central axis passing through the base, the circumferential wall having an inner and outer surface, said inner surface comprising a plurality of annular recesses,
- a housing for accommodating the centrifuge bowl, said housing having a base located in the central axis and a circumferential wall surrounding the central axis,
- an annular cavity defined by the centrifuge bowl wall and the housing wall, the annular cavity being fluidly connected to the plurality of annular recesses on the inner surface of the centrifuge bowl by a number of perforations in the centrifuge bowl wall
- an inlet configured to allow entry of a slurry into the centrifuge bowl, preferably arranged substantially in parallel with the central axis,
- means for rotating the centrifuge bowl about the central axis, and
- a fluid inlet fluidly connected to the annular cavity,
- wherein an accumulated cross-sectional flow area ($A_{flow}$) in the annular cavity at two different heights differs by at least a factor 10.

The height may be measured as the distance from the base of the centrifuge bowl along the central axis. Preferably the two different heights are either near the base of the centrifuge bowl (i.e. a low height), near the top of the centrifuge bowl (i.e. a high height) and/or in between the base and top.

With the above centrifuge it is possible not only to control the flow in the separator by adjusting the fluid inlet flow rate or by adjusting the rotational speed of the centrifuge bowl but also by designing the interior of the annular cavity so that fluid distributes advantageously and provides an optimized pressure profile. This allows for a better optimization and adjustment of the pressure in annular cavity and thereby an improved fluidization in the annular recesses. By the term accumulated is meant the cross-sectional flow area in the annular cavity along the entire circumference of the centrifuge bowl.

Preferably the $A_{flow}$ at two different heights in the annular cavity may differ by at least a factor 10, such as at least a factor 40, more preferably at least a factor 80, even more preferably at least a factor 100, even more preferably at least a factor 200. Preferably the factor is between 10 to 1000, such as 40 to 500, more preferably 60 to 250.

An increment in the factor between the $A_{flow}$ at two different heights effectively means that an $A_{flow}$ at one height is getting smaller than the $A_{flow}$ at the comparison height. The change in $A_{flow}$ may be a graduate increase along the centrifuge bowl wall or it may be a localized restriction.

In a preferred embodiment of the invention a first section of the annular cavity is at least partially separated from a second section of the annular cavity such that a pressure difference is provided between the sections. The separated sections in the annular cavity alters the flow in the annular cavity and provides individual pressure zones. This allows for a better adjustment of the pressure in annular cavity and thereby an improved fluidization in the annular recesses. This has been found to improve the efficiency of the separator.

The inventive concept builds on the recognition that when the separator is in use the fluid pressure in the annular cavity changes from the bottom of the annular cavity towards the top of the annular cavity due to the shape of the annular cavity, more particularly due to the varying distance from the center of rotation, i.e. the center axis, and the rotational speed of the centrifuge bowl. Typically, the fluid pressure increases from the base towards the top since the distance from the center axis increase towards the top of the annular cavity. As the annular recesses are located at different positions in the centrifuge bowl this results in a different fluid pressure and thereby also a different fluid flow through the perforations into the annular recesses. Particulate material in the slurry has different densities and sizes and a varying fluid pressure is good for collecting the different particulate material. It has been observed that certain adjacent annular recesses collect much more product material than others because they have an optimized fluid pressure and therefore a better fluidization of particulate material. Due to the inclination of the centrifuge bowl wall and the housing wall and because it rotates, it is not possible to have the same fluid pressure at all annular recesses with the prior art centrifuges. However, by having an $A_{flow}$ at two different heights in the annular cavity that differs by at least a factor 10, preferably that form at least two partially separated sections, it is possible to alter the fluid pressure in an additional way and obtain a more desired pressure (or pressure region) that may appear at several locations in the annular cavity. The optimized pressure increases the amount of product particulate material collected in the annular recesses and thereby increase the overall efficiency of the centrifuge.

Based on the number of annular recesses in the separator and the increase in fluid pressure in the annular cavity it may be beneficial to divide the annular cavity into 3 or more at least partially separated sections. Hence in a preferred embodiment the annular cavity comprises 3, 4, 5 or 6 at least partially separated sections. In another preferred embodiment the centrifuge may comprise as many at least partially separated sections as it has annular recesses. This design provides the option to configure the fluid pressure in each individual annular recess and to provide the same or at least very similar fluid pressure at all perforations into the annular recesses.

The fluid provided into the annular cavity may be a gas such as air or a liquid such as water. A gas is used to separate in dry conditions, whereas a liquid is used to separate under wet conditions.

Typically, the centrifuge of the present invention is used to separate valuable minerals with high density from rock. Valuable minerals are e.g. gold. These are referred to as product or product particulate material.

In a preferred embodiment the annular cavity is separated into an upper section and a lower section. In this context the terms upper and lower are defined with respect to the central axis. Preferably this axis is parallel to the direction of earth's gravity.

That the housing base is located in the central axis simply means that the central axis passes through the base. Preferably the central axis passes through the center of the housing base. Preferably, the central axis also passes through the center of the centrifuge bowl base.

At least partially separated should in this context be understood as the fluid flow between the at least partially separated sections is restricted to such a degree that a pressure difference between the sections is observed. This means that the pressure difference due to the partial separation of the sections is larger than the pressure increases due to the gravitational force of the rotating centrifuge. Such an increase may be achieved by restricting the cross-sectional flow area by at least a factor 10. This may be by localized constriction in the annular cavity. A localized constriction may be a barrier which restricts flow between each side of the barrier. How much the flow is restricted is determined by the size of the barrier, i.e. the magnitude of the factor between an $A_{flow}$ at the barrier and an $A_{flow}$ at another height in the annular cavity. The higher the factor, the more restriction of flow. As the factor between two $A_{flow}$ increases towards infinity, the constriction fully restricts the flow in the annular cavity. In this way the sections in the annular cavity may be fully separated or partly separated.

In a preferred embodiment the annular cavity comprises at least one barrier member adapted to divide the annular cavity into at least a first and second section. Preferably the barrier member may axially divide the annular cavity into sections thereby create a restriction around the entire circumference. The barrier member may be a protrusion from either the housing wall or the centrifuge bowl wall protruding towards the opposite wall, or it may be a barrier member contacting both the housing wall and the centrifuge bowl wall. In this way the barrier member may fluidly isolate or at least partly isolate the sections from each other. The barrier member may preferably be an annular barrier member having an annular shape adapted to contact the centrifuge bowl wall and/or the housing wall to separate the annular cavity into an upper or lower section. The barrier members may be located centrally in the annular cavity to provide an upper and lower section having substantially the same height and/or size, or is may be shifted towards the base or top. The height is here meant as the distance from the bottom of the annular cavity to the top of the annular cavity in a direction substantially parallel to the central axis. When the barrier member is shifted towards the base, it provides an annular cavity having a first section which is smaller than a second section.

In a preferred embodiment the first section and second section are fluidly connected. As an example, the sections may be separated by a barrier member, such as an annular wall or a ring having openings such as holes or perforations to allow a flow of fluid from the first section to the second section or vice versa through the holes or perforations. The barrier member may also comprise openings adapted to have orifice members or valves mounted therein. In this way an orifice member or valve can be changed or modified to allow a higher or lower amount of fluid to flow between the sections. As another example the sections may be separated by annularly spaced barrier members having a gap between them. This allows the fluid to pass through the gap. Alternatively, an annular barrier member may be located on either the centrifuge wall or the housing wall and provide an annular gap between the annular barrier member and the corresponding wall.

In a preferred embodiment of the invention the barrier member comprises an orifice member, said orifice member being a passive orifice, dynamic orifice or an active orifice. Where a passive orifice provides a predetermined reduction in flow, a dynamic orifice may comprise a loaded spring to provide a flow restriction based on different pressures. A loaded spring could also throttle flow based on centrifugal acceleration, i.e. throttle based on rotational speed of the centrifuge. An active orifice may be controlled by a computer, remote controller or the like, to change how much the flow is restricted. This change may be provided during use of the centrifuge to achieve an optimal operating condition.

In one or more preferred embodiment the barrier member comprises one or more active orifices. This allows for optimized pressure distribution between the two sections, and allows especially for optimizing the pressure distribution in the upper section.

In one or more preferred embodiments a pressure sensor is located in the upper section. The pressure sensors may be in communication with a controller device which allows adjustment of the one or more active orifices. The adjustment may be based on input from the pressure sensor, a flow sensor, a speed measuring device and/or a user setpoint. The flow sensor may be provided in the centrifuge to measure the flow into the annular cavity or between sections in the annular cavity. The speed measuring device may be configured to measure the rotational speed of the centrifuge during operation. The rotational speed may be used to estimate the centrifugal acceleration provided by the rotation.

In one or more preferred embodiments a pressure sensor is located in the lower section. This sensor may be in communication with a controller device which allows for adjustment of the one or more active orifices based on input from the pressure sensor.

In one or more preferred embodiments a pressure sensor is located in the lower section and the upper section.

In one or more preferred embodiments the fluid inlet, allowing entry of fluid into the annular cavity, comprises a control valve, which allows the amount of fluid into annular cavity to be adjusted. Preferably this control valve is in communication with a controller device and one or more pressure sensors in the upper and/or lower section. The controller device may therefore adjust the flow through the control valve based on input from the pressure sensors. This allows for improved pressure distribution in especially the lower section. In one or more embodiments a sensor is arranged to measure the fluid pressure or fluid flow to the fluid inlet. This sensor may be connected to the controller device.

Active control of the pressure distribution by means of active orifices, control valves and/or pressure/flow sensors allows for optimal pressure distribution and thereby an improved operation on the centrifuge. The pressure changes may be provided during operation or between operations.

As an example the pressure profile in the annular cavity may be adjusted as the inner surface of the centrifuge cone is worn and thereby achieve a higher product yield during the whole lifespan of the centrifuge cone.

As another example the pressure profile in the annular cavity may be adjusted during operation of the centrifuge and thereby adjust the fluidization in the annular recess to optimize the recovery of different size or density fractions.

In another preferred embodiment the first section and second section are fluidly isolated from each other. As an example, this may be achieved by a barrier member without any openings, such as an annular wall without any holes or perforations. The fluid may in this example be provided individually to the first section and second section. Alternatively, the first section and second section may be fluidly connected by a barrier by-pass which allow fluid to pass around the barrier. The barrier by-pass may be a conduit or channel located on the outside of the circumferential wall of the housing fluidly connecting the first section and the second section. The design, such as diameter or shape, of the barrier by-pass may be selected to control the flow between the sections.

In another preferred embodiment the at least one barrier member is integrated in the circumferential wall of the centrifuge bowl and/or the housing. This may be a protrusion of one of the circumferential walls restricting fluid flow between the first and second section.

The pressure profile of the fluid in the annular cavity is determined by the shape of the annular cavity, inclination of the centrifuge bowl wall and the housing wall, position of fluid inlet, rotational speed of the centrifuge bowl, fluid inlet pressure etc. Typically, the pressure increases from the bottom of the annular cavity towards the top of the annular cavity due to the rotation of the centrifuge bowl and inclination of the centrifuge bowl wall. The pressure gradient in the annular cavity is therefore positive going in a direction from the base towards the top of the centrifuge bowl. It may therefore alternatively or additionally be said that the invention is characterized in that the annular cavity of the centrifuge is configured to have a pressure gradient preferably along the outer surface of the centrifuge bowl wall, that has a positive and a negative value. The pressure gradient is the change in pressure from one place in the annular cavity to another, e.g. from the base to the top or vice versa. An annular cavity configured to have both a positive and negative pressure gradient value means that if the annular cavity has an increasing pressure towards the top it has a pressure drop, and if the annular cavity has a decreasing pressure towards the top is has a pressure increase. This change in pressure may be a high sudden change due to e.g. a barrier member, or a gradual change due to change in the annular cross-sectional area through the annular cavity.

Preferably the change between a positive and negative pressure gradient is located between two adjacent annular recesses. The change in pressure may be a localized pressure drop or build-up. In a preferred embodiment this is achieved by having an annular cavity at least partially separated into at least a first section and a second section. The first section and second section may be separated by e.g. an annular wall, or a barrier member. Preferably, the annular cavity is configured so that the pressure in the annular cavity at an annular recess is higher than the pressure in the annular cavity at the adjacent annular recesses. This may for example be achieved by having a barrier member or wall located between two annular recesses.

In a preferred embodiment the centrifuge comprises means to change the distribution of pressure in the annular cavity. This may e.g. be a decrease in pressure in one part of the annular cavity. Preferably the centrifuge comprises means to provide a substantial change in pressure between one part of the annular cavity and another part of the annular cavity. Preferably the means to change the distribution of pressure is located in or adjacent the annular cavity. As an example, the centrifuge bowl wall or the housing wall may comprise mounting means, allowing different sized inserts or barrier members to be mounted in the annular cavity to modify the annular cross-sectional areas through the annular cavity. It thereby becomes possible to change the design of the annular cavity by e.g. adding or removing barrier members, change the gap size between barrier members, decrease or increase the annular space between the barrier members and the adjacent wall etc. Additionally, the annular cavity may comprise several mounting means, at axially spaced positions along the housing wall or centrifuge bowl wall, which allows for mounting of the barrier members at different heights and the cross-sectional areas of the annular cavity to be configured, e.g. having several at least partially separated sections. Alternatively, if the annular cavity comprises a first section and second section separated by a wall, the wall may comprise one or more openings which allows for mounting of orifices or valves of different sizes. It may therefore be said that the pressure distribution in the annular cavity is configurable.

According to another aspect, the invention relates to a centrifuge bowl for use in a centrifuge for separating intermixed particulate material of different specific gravity, the centrifuge bowl having a base, a circumferential wall surrounding a central axis and an open end substantially opposite of the base, said central axis passing through the base, the circumferential wall having an inner and outer surface, said inner surface comprising a plurality of annular recesses at axially spaced positions on the inner surface of the centrifuge bowl and wherein the outer surface of the centrifuge bowl comprising a sealing portion.

The sealing portion is configured for contacting a corresponding surface on the centrifuge whereby a sealing effect is provided. Preferably the sealing portion is configured for mating with a surface of a barrier member of the centrifuge to provide the sealing. Both of these configuration provides at least a partial separation of an annular cavity of the centrifuge.

In one or more embodiments the sealing portion is configured to provide a sealing effect together with a gasket member, such as an O-ring or another type of rubber or plastic gasket, the gasket member being arranged between the sealing portion and the barrier member. The sealing portion of the outer surface may be a flange, protrusion, undercut, indent, groove or recess. The flange or protrusion may protrude in any direction towards the housing wall of the centrifuge and provide a mating surface with the barrier member optionally together with the gasket member. An undercut, indent, groove or recess in the outer surface of the centrifuge bowl may be configured to accommodate a protruding portion of a barrier member or a gasket, such as an O-ring.

In a preferred embodiment of the invention the portion of the centrifuge bowl wall that includes recesses has at least two different inclinations with regards to the central axis. In other words, the inner surface of the centrifuge bowl wall may have a first portion and a second portion both comprising one or more annular recesses. The first portion of the inner surface of the centrifuge bowl has an angle with respect to the central axis which is different than the angle of a second portion of the inner surface of the centrifuge bowl.

The angles may vary between 5 degrees and 15 degrees. Preferably the difference in inclination between the angles is at least 3 degrees to 5 degrees.

During intended use when the centrifuge bowl is rotated and slurry is provided into the centrifuge bowl, the rotation of the bowl generates a centrifugal force acting on the particles in the slurry and forces them in a radial direction towards the centrifuge bowl wall. The inclination of the bowl wall determines the distance from the center of rotation, i.e. the center axis, and thereby also the magnitude of the centrifugal force that acts on the particles in the radial direction and the resulting force acting on the particle in a direction parallel with the surface of the centrifuge bowl wall. The angle therefore determines how much of the centrifugal force act on the particles towards the recesses and in an upwards direction. The inventors have surprisingly found that by varying the angle the recovery of high density minerals improves. Without being bound by any theory it is believed that relatively shallower angle in a section helps to accelerate feed up the bowl wall and minimizes the hydraulic transition zone as the feed is deposited at the base of the bowl, maintaining or improving throughput capabilities relative to the existing designs. A steeper, but not vertical section maintains a relatively uniform film thickness of feed moving up the peripheral wall, while minimizing the overall difference in radius between the upper and lower recesses, thereby reducing the localized differences in pressure in the jacket due to centrifugal forces.

In a preferred embodiment the first portion of the inner surface is located closer to the centrifuge bowl base than the second portion of the inner surface and that the angle of the first portion of the inner surface is greater than the angle of the second portion of the inner surface. This configuration provides a bowl wall that is steeper towards the top of the centrifuge bowl. The angle is measured with respect to the central axis.

Preferably the centrifugal bowl wall has an angle relative to the central axis of 5 to 15 degrees. Preferably the angle of the lower section is 10 to 15 degrees, such as 12.5 degrees. Preferably the angle of the upper section relative to the central axis is 5 to 10 degree, more preferably 7 to 9 degrees, such as 8 degrees.

In another preferred embodiment the angle of the centrifuge bowl wall may be varied at several locations between the base and the open end. Preferably the centrifuge bowl wall may substantially be shaped as a half sphere or a paraboloid.

In another embodiment of the invention the distance between recesses is varied through the centrifuge bowl. The distance is measured from the upper edge of an annular recess to the lower edge of the next recess up. Preferably the distance is greater towards the base of the centrifuge bowl. The change in distance provide the effect that there is room for more material between the recesses. An increase in material thickness provides a longer life span of the bowl. Especially in the lower portion of the centrifuge bowl this is beneficial since more wear is observed here. The distance may be varied by having a larger spacing between the recesses or by making the annular recess wider. Therefore in a preferred embodiment a first lower portion of the inner surface comprises recesses that is wider and/or more spaced than recesses in a second portion of the inner surface.

According to another aspect, the invention relates to a system for processing raw material comprising precious metal ore, the system comprising at least one comminution unit and at least one physical separation unit, wherein the system comprising at least one physical separation unit in the form of a centrifuge for separating intermixed particulate material of different specific gravity comprising a centrifuge bowl having a base, a circumferential wall surrounding a central axis and an open end substantially opposite of the base, said central axis passing through the base, the circumferential wall having an inner and outer surface, said inner surface comprising a plurality of annular recesses, a housing for accommodating the centrifuge bowl, said housing having a base located in the central axis and a circumferential wall surrounding the central axis, an annular cavity defined by the centrifuge bowl wall and the housing wall, the annular cavity being fluidly connected to the plurality of annular recesses on the inner surface of the centrifuge bowl by a number of perforations in the centrifuge bowl wall an inlet configured to allow entry of a slurry into the centrifuge bowl, preferably arranged substantially in parallel with the central axis, means for rotating the centrifuge bowl about the central axis, and a water inlet fluidly connected to the annular cavity, wherein an accumulated cross-sectional flow area ($A_{flow}$) at two different heights in the annular cavity differs by at least a factor 10.

It is apparent that any of the previous described embodiments of the centrifuge additionally may be implemented in such a system.

The at least one comminution unit may be a crusher in the form of a gyratory crusher, cone crusher, and/or a jaw crusher, a mill in the form of a SAG mill, rod mill and/or a ball mill.

Optionally the system may additionally comprise at least one chemical separation unit preferably in the form of a flotation unit, such as a froth flotation unit, or a leaching unit, such as a unit utilizing carbon in leach (CIP) or carbon in pulp (CIP), or an inline leach reactor (ILR)

Additionally, the system may comprise other physical separation units such as sedimentation unit, thickener unit, screening units, filtering units, such as a pressure filter, cyclones, tables, and/or magnetic separators Further presently preferred embodiments and further advantages will be apparent from the following detailed description and the appended dependent claims.

BRIEF DESCRIPTION OF THE DRAWINGS

The invention will be described in more details below by means of non-limiting examples of presently preferred embodiments and with reference to the schematic drawings, in which.

DETAILED DESCRIPTION OF EMBODIMENTS OF THE INVENTION

Figure 1:
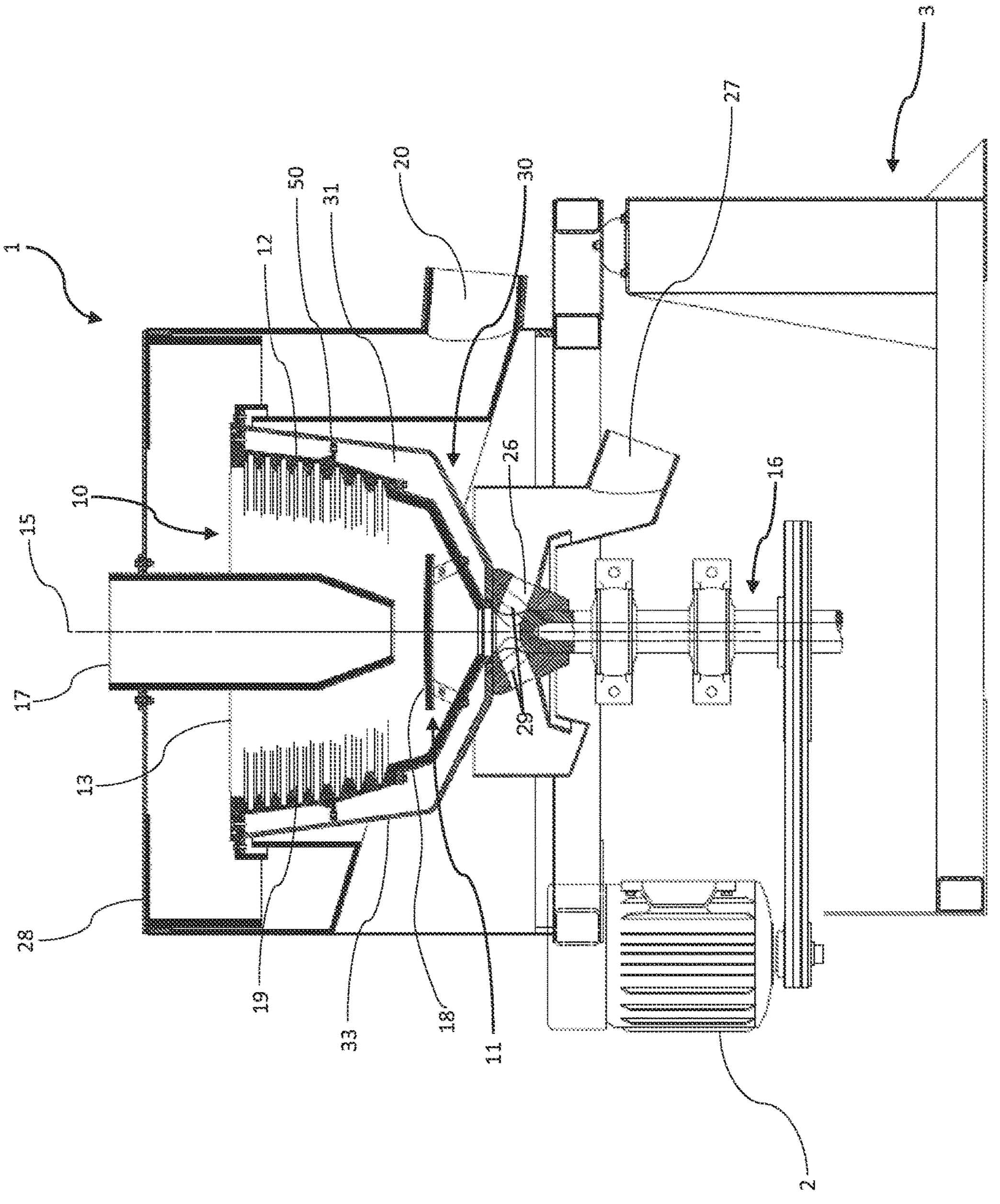
FIG. 1 shows a schematic cross-sectional view of a centrifuge according to an embodiment of the invention.

FIG. 1 shows a schematic view of a centrifuge 1 according to one embodiment of the invention. The centrifuge 1 comprises a centrifuge bowl 10 having a base generally indicated at 11 and a peripheral centrifuge bowl wall 12 standing upwardly from the base 11 to an open mouth 13. The centrifuge bowl 10 is attached to a support shaft 16 which enables the centrifuge bowl 10 to rotate around a central axis 15. In the specific embodiment shown the shaft 16 is supported by bearings and the means for rotating the centrifuge bowl 10 is in the form a motor 2. The motor 2 drives the shaft 16 through a belt and a pulley arrangement. The rotation means and the bearings are mounted on a support frame 3. A feed duct 17 is arranged through the open mouth 13 and configured to provide a feed preferably in the form of a mixture of heavier and lighter particulate materials in a water slurry. The inlet of the feed duct is preferably located at a position near the base 11. In the particular embodiment shown, the feed is provided along the central axis 15 and deposited onto a guide plate 18 at the base 11. The feed is then deflected in a radial directed with regards to the central axis 15. The feed then moves onto the peripheral wall 12 for separation of the heavier materials into a plurality of annular recesses 19 on the peripheral wall 12 while the lighter materials in the feed pass over the centrifuge bowl wall 12 to the open mouth 13 for discharge. Material exiting from the open mouth 13 is collected by a launder 20.

The inner surface 23 of the peripheral wall of the centrifuge bowl 10 is generally formed by molding a liner material onto a metal shell or skeleton frame. Thus, the recesses are formed directly by the liner material while the bowl is structurally formed from metal. The liner material is generally a resilient polymer material such as urethane which is resistant to wear.

The overall angle of the centrifuge bowl wall 12 relative the central axis 15 may vary or be constant. In the embodiment shown in FIG. 2 the centrifuge wall 12 has a first lower portion 45 which has a larger angle relative to the central axis 15 than a second upper portion 46 of the centrifuge wall 12. Alternatively, the centrifuge wall 12 may have a first, second, and third portion, each having a different angle smaller than the previous section relative to the central axis 15. It is clear that the number of sections having a different angle may be increased further. As the number of sections is increased the shape becomes rounder and ultimately the shape of the centrifugal wall 12 in a cross-sectional view may be circular, i.e. the centrifuge bowl wall 10 may have a shape similar to a half sphere or a paraboloid.

The annular recesses 19 are axially spaced along an inner surface 23 of the centrifuge bowl wall 12. The centrifuge bowl wall 12 is substantially frusto-conical so that the diameter of the annular recesses 19 increases from a first recess at the base 34 to a last recess at the open mouth 13. By diameter is meant the distance from one point on the base 40 of an annular recess through the central axis 15 to a point on the base 40 of the same annular recess 19 on the opposite site of the centrifuge bowl 10. The annular recesses 19 include side walls 41 which converge towards a base 40 of the recess 19.

Material that passes over the centrifuge bowl wall 12 through the open mouth 13 is collected by a launder 20 for discharge. Around the centrifuge bowl 10 is provided a housing 30 defining an enclosure around the centrifuge bowl 10. The housing 30 has a housing wall 33 and a base 34. The base 34 is connected to the base 11, and the housing wall 33 is connected to the centrifuge bowl wall 10 near the open mouth 13. The centrifuge bowl wall 10 and the housing 33 thereby defines an annular cavity 31. Openings 32 fluidly connect the annular cavity 31 with the base of the annular recesses 19, The annular cavity 31 has a fluid inlet 29, preferably located near the base 34 and adapted to provide pressurized fluid into the annular cavity 31. Preferably the fluid may be supplied by a duct through the shaft. The fluid may be a liquid such as water or a pressurized gas such as air. The fluid distributes in the annular cavity 31, and may flow through the openings 32 in the centrifuge howl wall 12 into the annular recesses 19. The openings 32 may be a plurality of small perforations or a single opening comprising a changeable orifice. The orifices may then comprise perforations in different numbers and sizes. The pressurized fluid, fluidizes material collected in the annular recess 19 and results in that a fluidized bed is defined in the annular recesses 19. The fluidized beds acts to separate heavier material which tends to collect in the recesses from lighter material which tends to be flushed out of the recesses and out of the open mouth 13 of the centrifuge bowl 10.

The separation and collection process is a batch process so that the heavier material is collected in the recesses for subsequent wash down and collection. Lighter material flows upwards and is discharged through the open mouth 13. After separation the collected material is washed down to the base 11 and passed through a discharge opening 26 and through the concentrate outlet 27. The feed duct 17 comprises a cylindrical tube carried on a cover 28 of the launder 20. Thus, the tube forming the feed duct 17 is in fixed position and remains stationary as the centrifuge bowl 10 rotates around the axis 15. As the centrifuge bowl 10 and housing 30 is rotated, feed material in the centrifuge bowl 10, but also fluid in the annular cavity 31 is subject to centrifugal acceleration. While the centrifuge 1 is rotating the fluid in the annular cavity 31 exhibits a pressure distribution that largely increases with distance from the central axis 15, while to a lesser extent decreasing with elevation. The centrifuge of the present invention is configured with means to change this pressure distribution to a more beneficial pressure distribution which allows greater control over the fluid flow supplied to the individual annular recesses 19.

Figure 2:
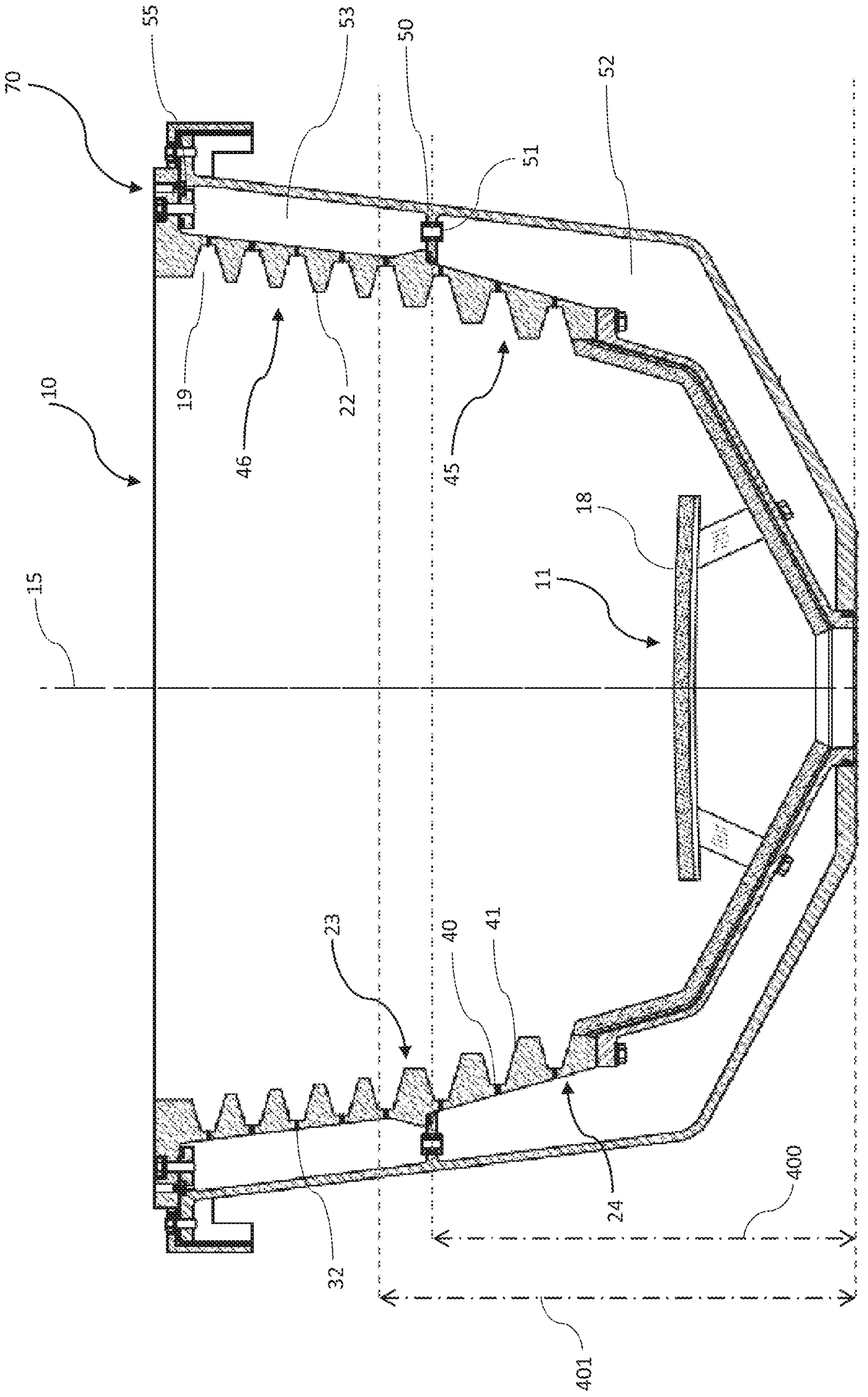
FIG. 2 shows a schematic cross-sectional view of a centrifuge bowl and a housing according to an embodiment of the invention.

Turning now to FIG. 2 showing the centrifuge bowl 10 in greater detail. The annular cavity 31 is configured with means for changing the pressure distribution. This is achieved by separating the annular cavity into at least a first lower section 52 and a second upper section 53 separated by a barrier member 50. The barrier member 50 is in this embodiment shown in the form of an annular ring 200 mounted between the housing wall 33 and centrifuge bowl wall 12. The first section 52 and second section 53 are fluidly connected by means of barrier openings 51 in which orifices are mounted. The barrier openings 51 are spaced around the barrier member 50 to provide the desired flow. In the cross-sectional view presented in FIG. 2 only two barrier openings 51 can be seen, but 16 barrier openings are distributed around the barrier member 50. Alternatively, the barrier member 50 may comprise 4 to 30 barrier openings, preferably 10 to 20 barrier openings.

Two different planes through the centrifuge bowl at a height 400 and a height 401 is indicated by dotted lines. The height is measured from the base and any height between the base and top of the centrifuge bowl 10 may be selected. At height 401 the dotted line passes through the second section 53 of the annular cavity. The area of the annular cavity in this plane is referred to as the accumulated cross-sectional flow area ($A_{flow}$). At height 400, the dotted line passes through the barrier member 50 and the barrier opening 51. The $A_{flow}$ at this height is substantially smaller than the $A_{flow}$ at height 401, since fluid is allowed only to flow through the sixteen barrier openings 51. The difference between $A_{flow}$ at height 400 and $A_{flow}$ at height 401 is around a factor 100.

The barrier member 50 may comprise a number of openings allowing passage of fluid. Some of these openings may have an orifice installed therein and other openings may have a plug installed therein. Both the orifices and plugs are removably attached, so that they can be replaced. By configuring the barrier member 50 with a desired number of orifices or plugs, it is possible to increase or decrease the flow between the first section and second section. The orifice allows the channel through the opening to be modified. However, it is also possible not to install any plug or orifice in the opening. This configuration provides the largest flow through the opening. It is therefore possible to vary the factor of the two $A_{flow}$'s for this shown embodiment to between 20 to 1000 by installing orifices or plugs in the barrier openings 51. A variety of barrier members 50 will be discussed later with regards to FIG. 6.

In the present embodiment the annular cavity 31 is provided with a fluid inlet near the base 34 in the first lower section 52. Once the centrifuge bowl 10 rotates, the fluid pressure will increase up through the annular cavity because of the sloped peripheral wall of the housing and centrifuge bowl and hence an increasing distance from the center axis 15. The pressure in the first section 52 will therefore increase towards the barrier member 50. Because the flow through the barrier member 50 is restricted, the fluid pressure will decrease across the barrier member 50. The pressure in the second upper section 53 adjacent the barrier member 50 is therefore lower than a pressure adjacent the barrier member 50 in the first section 52. The maximum pressure in the first section 52 is therefore higher than the lowest pressure in the second section 53.

Figure 8:
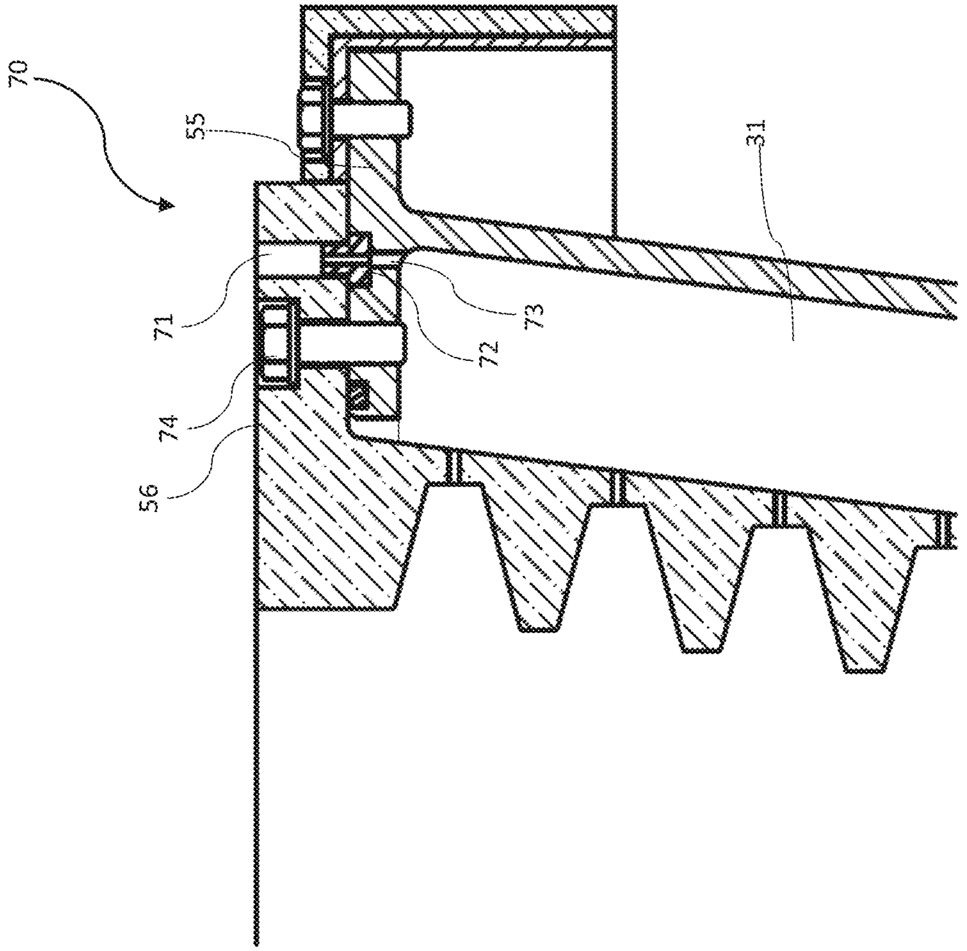
FIG. 8 shows a schematic cross-sectional view of an upper portion of a centrifuge bowl and housing according to an embodiment of the invention.

Particulate materials may be present in the annular cavity 31, due to for example an impure water supply, and will be subject to centrifugal forces, causing them to settle outwards and upwards on the sloped peripheral housing wall 33. The centrifuge bowl wall 12 comprises a plurality of openings 71 around the periphery of the top flange 56 to expel and prevent the accumulation of this particulate material. This is shown in more detail in FIG. 8 which show a cross-sectional view an upper portion of the centrifuge comprising the top flange 56 and the de-silting means 70. A de-silting nozzle 72 is located in each of the openings 71 to control the discharge rate and improving maintainability due to their easy replacement. In the present embodiment the top flange 56 of the centrifuge bowl has been expanded to envelope these openings, with the de-silting nozzle inserts being held down by the centrifuge bowl 12. An opening 73 is located in the housing top flange 55 to fluidly connect the annular cavity 31 to the surroundings. The housing 30 and the centrifuge bowl 10 are removably attached to each other in the flanges (55, 56) by fastening means 74 in the form of a shredded bolt and a corresponding shredded hole in the flanges. By having the de-silting means located in the flange 56 of the centrifuge bowl, compared to in the housing flange 55, allows for the diameter of the centrifuge bowl 10 to be larger. This increase the distance from the center axis 15 of the centrifuge 1 and thereby increase the centrifugal force.

Whereas in the prior art the desilting openings were located outside the radius of the top flange 56 of the centrifuge bowl 10, in the present embodiment the desilting openings pass through both the bowl top flange 56 as well as the housing top flange 55, allowing for an increase in the centrifuge bowl diameter as well as an optimization of the fastener configuration attaching the bowl to the housing. De-silting nozzle inserts may be installed in the de-silting openings 71 as before, or in an alternative arrangement the de-silting nozzle may be incorporated into the housing flange 55 or the centrifuge bowl flange 56

Figure 3:
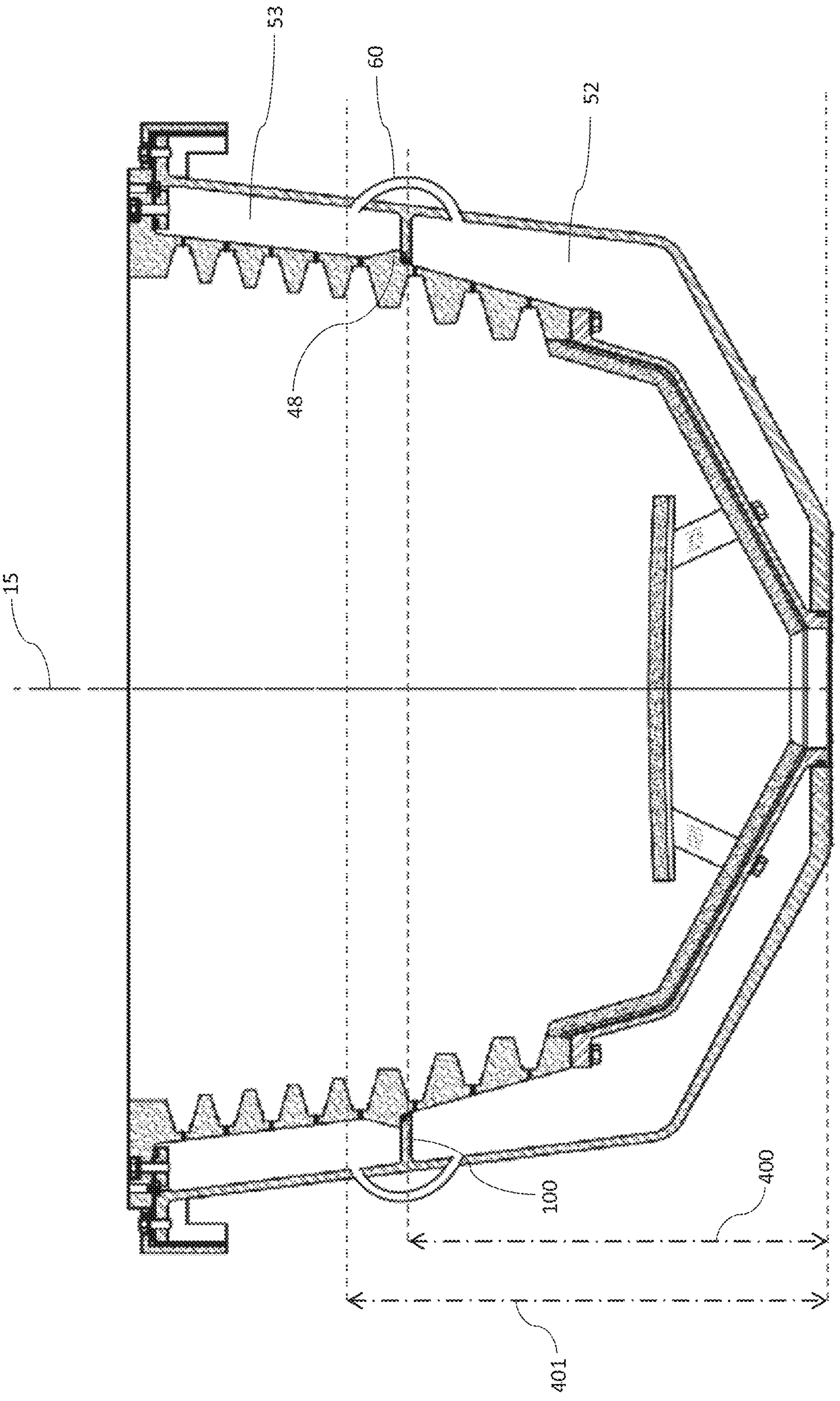
FIG. 3 shows a schematic cross-sectional view of a centrifuge bowl and a housing according to another embodiment of the invention.
Figure 4:
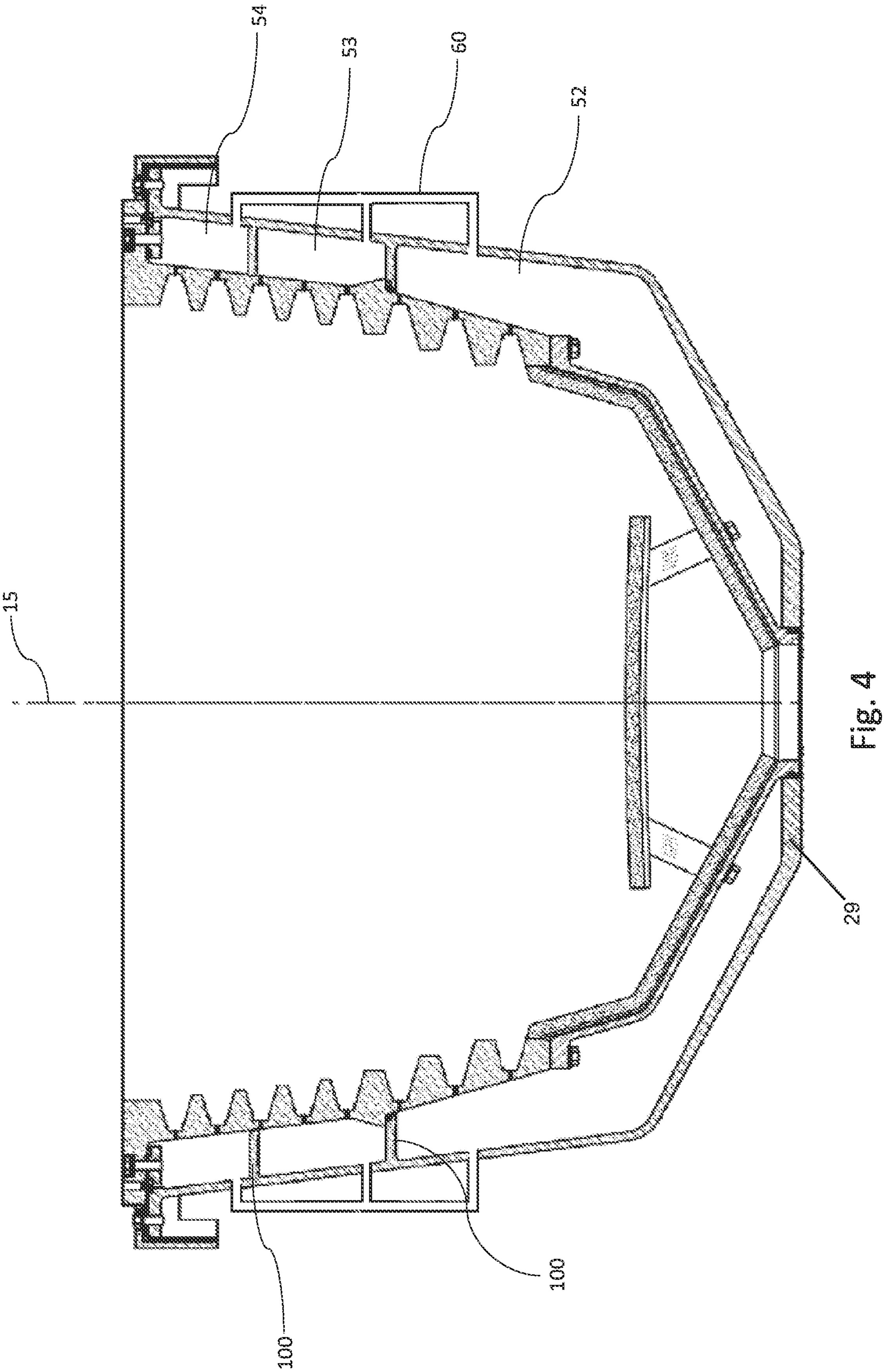
FIG. 4 shows a schematic cross-sectional view of a centrifuge bowl and a housing according to yet another embodiment of the invention.
Figure 5:
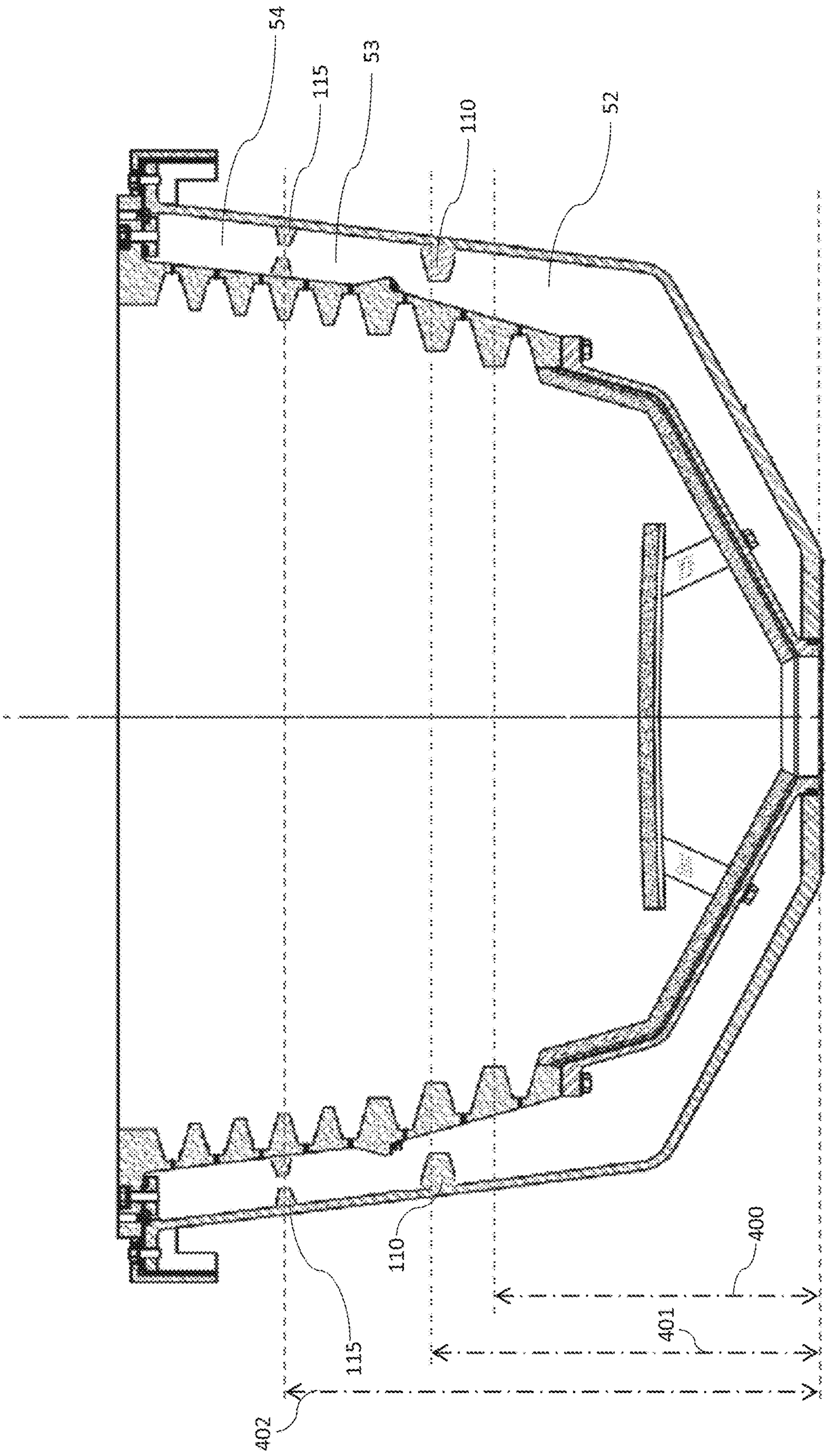
FIG. 5 shows a schematic cross-sectional view of a centrifuge bowl and a housing according to yet another embodiment of the invention.

Turning now to FIG. 3, FIG. 4, and FIG. 5 showing different embodiments of the centrifuge bowl 10 and housing 30 comprising different barrier members 50. In FIG. 3 the barrier member 50 is a solid ring 100. The ring 100 do not comprise any openings between the first section 52 and the second section 53. Instead the first section 52 and second section 53 are in fluid communication by means of a set of by-pass conduits 60.

The by-pass conduits 60 acts as a fluid outlet in the first section 52 and a fluid inlet in the second section 53. The location of the inlet and outlet may in this way be modified. The set of by-pass conduits 60 are distributed around the outer wall of the housing 30. The solid ring 100 is in this embodiment integrated with the housing wall. The ring 100 are in contact with a sealing portion 48 of the centrifuge bowl in the form of a flange. A gasket may be provided between the ring 100 and the flange to form a tight seal.

The annular cavity 31 may also be divided into a plurality of sections such as more than two sections. An embodiment of the invention having this configuration is shown in FIG. 4. The annular cavity 31 is separated into three sections by means of two barrier members 50 in form of two solid rings 100. The first section 52 is in fluid communication with the second section 53 and the third section 54 by means of a set of by-pass conduits 60. Alternative to this configuration, the first section 52 and second section 53 may be connected by a first set of by-pass conduits 60, and the second section 53 and third section 54 may be connected by a second set of by-pass conduits 60. Alternatively, each of the first section 52, second section 53, and optionally the third section 54 are supplied by an individual fluid inlet. This provides the option to supply the same or different fluid pressure in each of the sections. The more the annular cavity 31 is divided into sections, the more the pressure profile may be controlled. A plurality of sections may naturally also be fluidly connected by the barrier members shown in FIG. 2.

Turning now to FIG. 5 showing another embodiment of the invention, in which the annular cavity comprises a plurality of barrier members 50 in the form of barrier inserts 110 and 115. A number of barrier inserts 110 are removably attached along the circumference of the housing wall 33 to provide a restriction of the flow between a first section 52 and a second section 53. The barrier inserts 110 and the housing wall 33 are provided with mutual corresponding fastening means. As an example, the barrier inserts 110 may be provided with a threaded pin and the housing wall 33 a corresponding threaded hole. The barrier inserts 110 may vary in size. The distance between the barrier inserts 110 can be changed by providing barrier inserts 110 which are narrower or wider. Similarly, the length of the barrier inserts 110 can be varied to provide a desired gap between the barrier inserts 110 and the outer surface of the centrifuge bowl wall 24. A number of sets of barrier inserts 115 may be removably attached along the circumference of the housing wall 33 and the outer surface of the centrifuge bowl wall 24. This provides a gap between the barrier inserts 115. The barrier inserts 115 may also be varied in size to provide a larger or smaller gap. In the embodiment shown, the difference in $A_{flow}$ at height 400 and $A_{flow}$ at height 401 is a factor 6 whereas the difference in $A_{flow}$ at height 400 and 402 is a factor 9. The barrier inserts 115 therefore provides a larger pressure reduction than barrier inserts 110 provided the loss coefficient is similar.

Figure 6A:
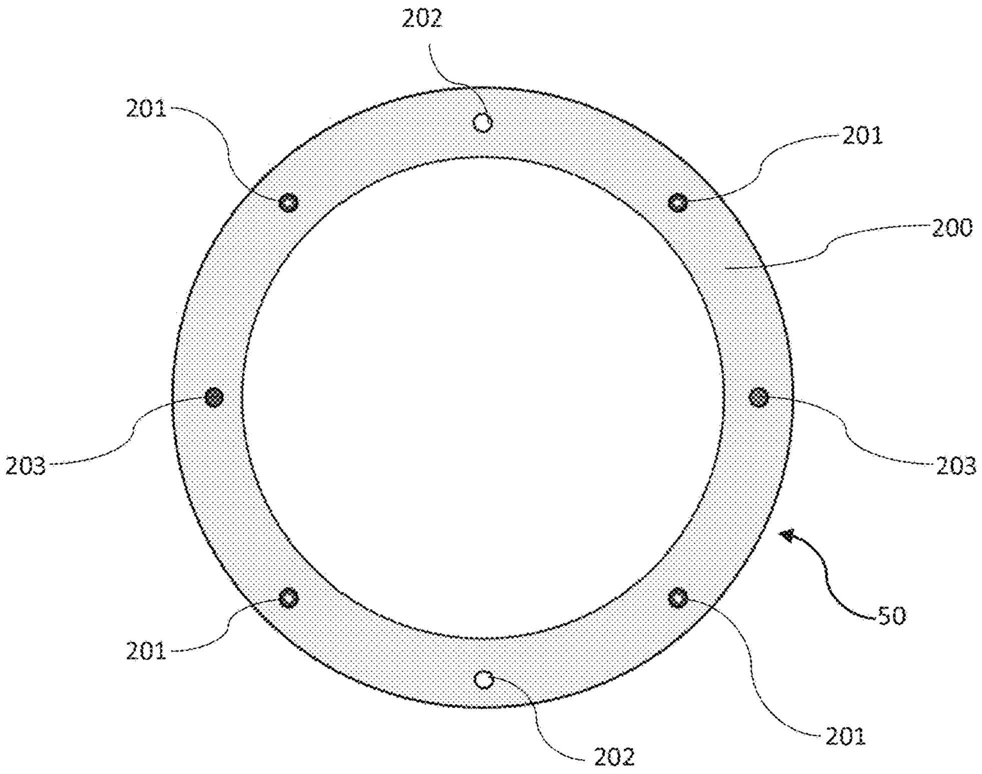
FIG. 6*a* to FIG. 6*c* show a top view of a variety of different barrier members according to an embodiment of the invention.
Figure 6B:
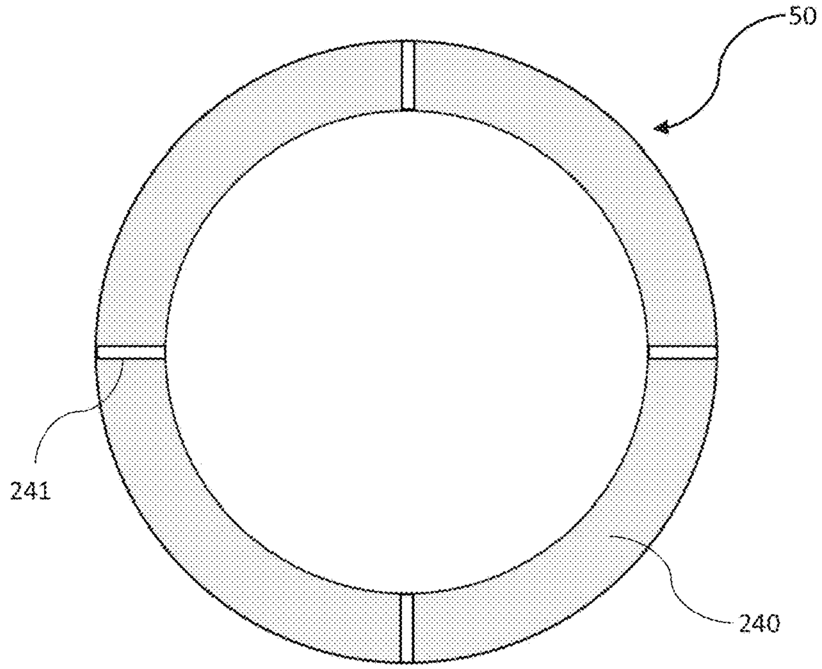
Figure 6C:
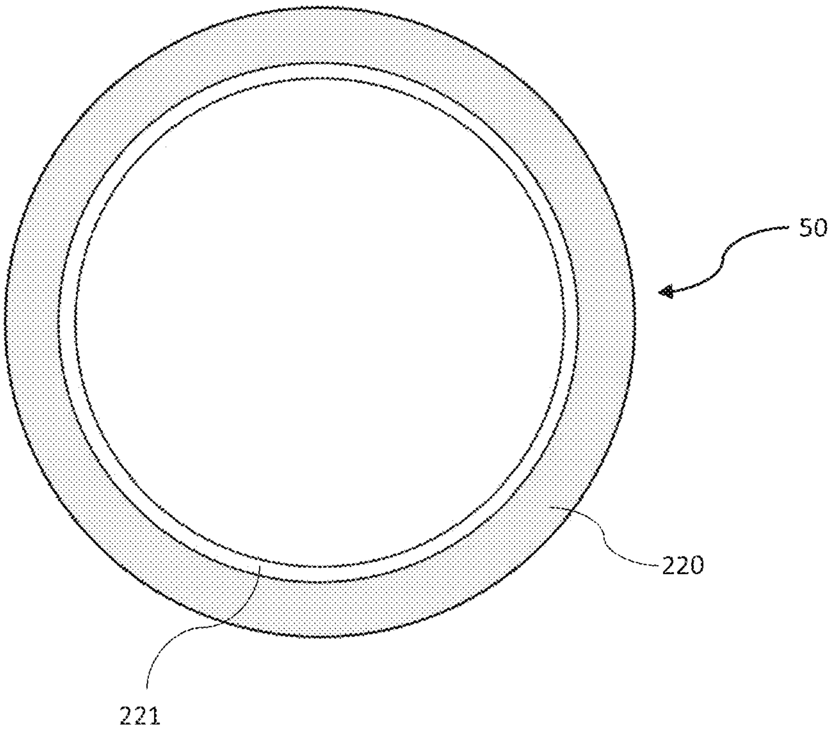

Turning now to FIG. 6*a*, FIG. 6*b* and FIG. 6*c* which show different barrier members 50 in the form of annular barrier members. Annular barrier member 200 comprises eight evenly distributed openings 202 in the form of drilled holes. When the annular barrier member 200 is installed in an annular cavity 31, the openings 202 fluidly connects different sections of the annular cavity 31. The openings may have an orifice 201 or a plug 203 installed therein, to increase the restriction in flow of fluid between sections. The barrier member 200 may provide a difference in $A_{flow}$ of at least a factor 40 to 60 with all openings 202 open. If orifices of plugs are installed the difference in $A_{flow}$ may be even higher.

The annular barrier member 240 comprises openings in the form of four radial openings 241. The openings 241 may be fully opened or may be covered by a perforated or solid plate to limit flow through the barrier member 240. The plate may be welded or screwed onto the barrier member 240.

The annular barrier member 220 comprise an annular opening 221 along the inner periphery. The annular opening might alternatively be located along the outer periphery.

Figure 7:
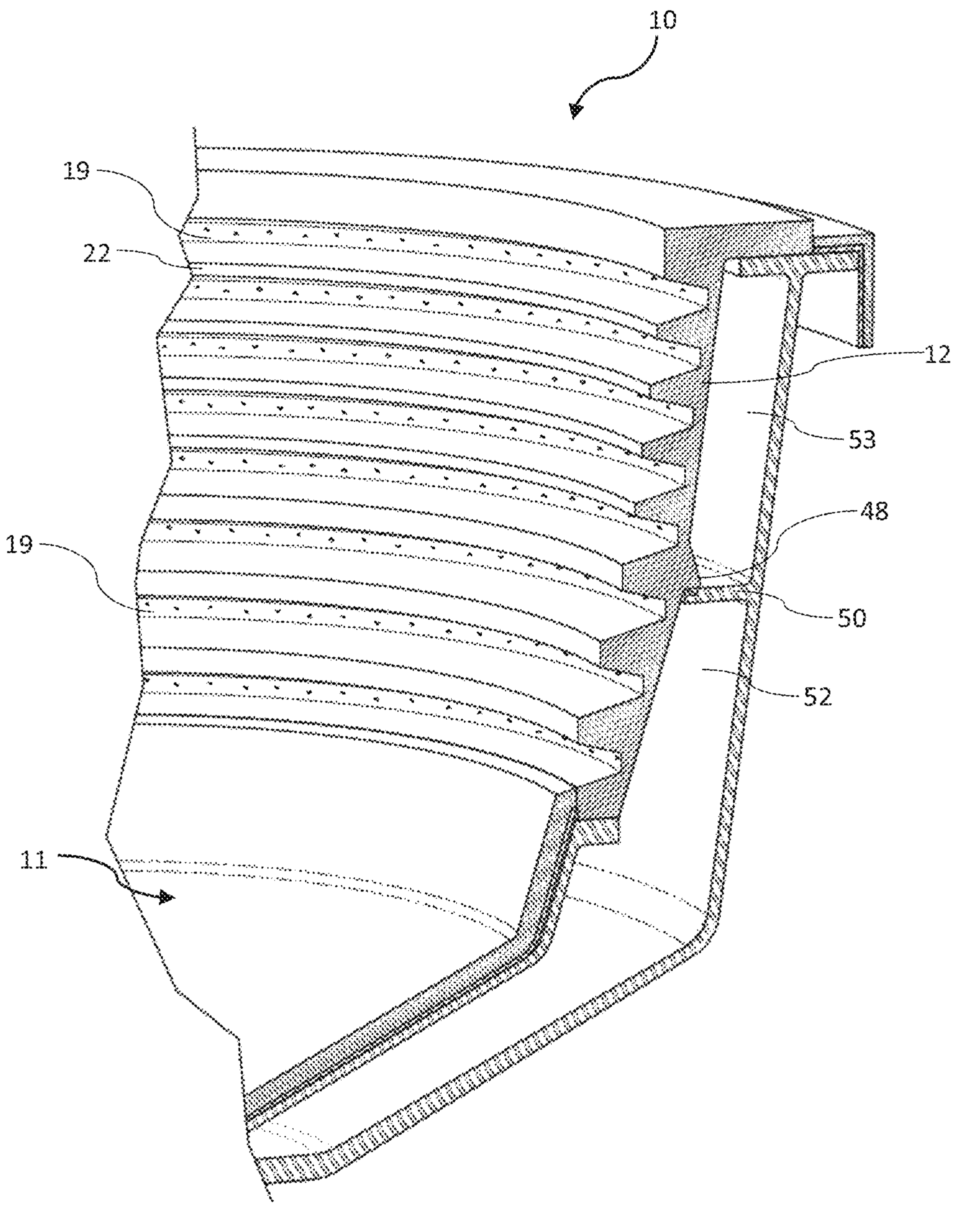
FIG. 7 shows a schematic perspective view of a section of a centrifuge bowl according to an embodiment of the invention.

Turning to FIG. 7 which show a perspective view of a portion of a centrifuge bowl 10. It can be seen that the recesses 19 are wider and more spaced in the lower portion of the centrifuge bowl 10 than in the upper portion of the centrifuge bowl 10. The tips 22 of the annular recess, in the lower portion of the centrifuge bowl, are thicker and hence have relatively more wear material where higher wear is observed.

LIST OF REFERENCE NUMBERS

Centrifuge 1
Rotation means 2
Support frame 3
Centrifuge bowl 10
Base 11
Centrifuge bowl wall 12
Open mouth 13
Central axis 15
Support shaft 16
Feed duct 17
Guide plate 18
Annular recess 19
Launder 20
Ring Tip 22
Inner wall of centrifuge bowl 23
Outer wall of centrifuge bowl 24
Discharge opening 26
Concentrate outlet 27
Cover 28
Housing 30
Annular cavity 31
Centrifuge bowl wall openings 32
Housing wall 33
Housing base 34
Recess base 40
Side walls of recess 41
Lower portion of bowl wall 45
Upper portion of bowl wall 46
Sealing portion 48
Barrier opening 51
First section 52
Second section 53
Third section 54
Housing top flange 55
Centrifuge bowl top flange 56
By-pass conduit 60
De-silting means 70
Opening in top flange 71
De-silting nozzle 72
Housing flange opening 73
Fastening means 74
Solid annular ring 100
Barrier insert 110
Barrier inserts 115
Annular barrier member 200
Orifice 201
Opening 202
Plug 203
Annular barrier member 220
Annular opening 221
Annular barrier member 240

Radial opening 241
Height 400
Height 401

The invention claimed is:

1. A centrifuge bowl (10) having a base, a circumferential wall surrounding a central axis and an open end substantially opposite of the base, said central axis passing through the base, the circumferential wall having an inner and outer surface, the inner surface (23) of the centrifuge bowl comprising a plurality of annular recesses (19) at axially spaced positions; wherein a first portion of the inner surface of the centrifuge bowl comprises one or more recesses having an angle with respect to the central axis (15) which is different than the angle of a second portion of the inner surface of the centrifuge bowl comprising one or more recesses; wherein the difference in inclination between the angles of the first portion of the inner surface and the second portion of the inner surface is at least 3 degrees to 5 degrees.

2. The centrifuge bowl (10) according to claim 1, wherein the second portion of the inner surface is located closer to the centrifuge bowl base (11) than the first portion of the inner surface and that the angle of the second portion of the inner surface is greater than the angle of the first portion of the inner surface.

3. The centrifuge bowl (10) according to claim 1, wherein the centrifuge bowl wall may substantially be shaped as a half sphere or a paraboloid.

4. The centrifuge bowl (10) according to claim 1, wherein the difference in angles of the first portion of the inner surface and the second portion of the inner surface is between 5 degrees and 15 degrees.

5. The centrifuge bowl (10) according to claim 1, wherein a recess distance between recesses, measured from an upper edge of an annular recess to a lower edge of the next recess, varies.

6. The centrifuge bowl (10) according to claim 1, wherein a recess distance is varied by having different sized spacings between the recesses.

7. The centrifuge bowl (10) according to claim 1, wherein a first lower portion of the inner surface comprises recesses that is more spaced than recesses in a second portion of the inner surface.

8. A centrifuge (1) for separating intermixed particulate material of different specific gravity comprising:

a centrifuge bowl (10) having a base (11), a circumferential bowl wall (12) surrounding a central axis (15) and an open end substantially opposite of the base (11), said central axis (15) passing through the base (11), the circumferential bowl wall (12) having an inner and outer surface, said inner surface comprising a plurality of annular recesses (19);

a housing (30) for accommodating the centrifuge bowl (10), said housing (30) having a base (34) located in the central axis (15) and a circumferential housing wall (33) surrounding the central axis (15);

an inlet (17) configured to allow entry of a slurry into the centrifuge bowl (10), preferably arranged substantially in parallel with the central axis (15);

means for rotating the centrifuge bowl (10) about the central axis (15);

an upper portion of the housing wall (33) is connected to an upper portion of the bowl wall (46), and the base (11) of the centrifuge bowl is connected to the base (34) of the housing thereby defining an annular cavity (31) between the bowl wall (12) and the housing wall (33);

the annular cavity (31) being fluidly connected to the plurality of annular recesses (19) on the inner surface of the centrifuge bowl by a number of perforations in the bowl wall (12);

a fluid inlet fluidly connected to the annular cavity (31), wherein a first portion of the inner surface of the centrifuge bowl comprising one or more recesses has an angle with respect to the central axis (15) which is different than the angle of a second portion of the inner surface of the centrifuge bowl comprising one or more recesses; wherein the difference in inclination between the angles of the first portion of the inner surface and the second portion of the inner surface is at least 3 degrees to 5 degrees.

9. The centrifuge according to claim 8, wherein the second portion of the inner surface of the centrifuge bowl is located closer to the centrifuge bowl base (11) than the first portion of the inner surface of the centrifuge bowl and that the angle of the second portion of the inner surface is greater than the angle of the first portion of the inner surface.

10. The centrifuge according to claim 8, wherein the difference in angles of the first portion of the inner surface and the second portion of the inner surface is between 5 degrees and 15 degrees.

11. A centrifuge (1) for separating intermixed particulate material of different specific gravity comprising:

a centrifuge bowl (10) having a base (11), a circumferential bowl wall (12) surrounding a central axis (15) and an open end substantially opposite of the base (11), said central axis (15) passing through the base (11), the circumferential bowl wall (12) having an inner and outer surface, said inner surface comprising a plurality of annular recesses (19);

a housing (30) for accommodating the centrifuge bowl (10), said housing (30) having a base (34) located in the central axis (15) and a circumferential housing wall (33) surrounding the central axis (15);

an inlet (17) configured to allow entry of a slurry into the centrifuge bowl (10), preferably arranged substantially in parallel with the central axis (15);

means for rotating the centrifuge bowl (10) about the central axis (15);

an upper portion of the housing wall (33) is connected to an upper portion of the bowl wall (46), and the base (11) of the centrifuge bowl is connected to the base (34) of the housing thereby defining an annular cavity (31) between the bowl wall (12) and the housing wall (33);

the annular cavity (31) being fluidly connected to the plurality of annular recesses (19) on the inner surface of the centrifuge bowl by a number of perforations in the bowl wall (12);

a fluid inlet fluidly connected to the annular cavity (31), wherein an accumulated cross-sectional flow area ($A_{flow}$) at two different heights in the annular cavity (31) differs by at least a factor of 10, such that a first section of the annular cavity (52) is at least partially separated from a second section of the annular cavity (53).

12. The centrifuge (1) for separating intermixed particulate material according to claim 11, wherein the $A_{flow}$ at two different heights in the annular cavity (31) differs by at least a factor of 100.

13. The centrifuge (1) for separating intermixed particulate material according to claim 11, wherein the annular cavity (31) comprises at least one barrier member (50) adapted to at least partially separate the annular cavity (31) into at least a first and second section (52,53).

14. The centrifuge (1) for separating intermixed particulate material according to claim 13, wherein the at least one barrier member (50) is integrated in the bowl wall (12) and/or the housing wall (33).

15. The centrifuge (1) for separating intermixed particulate material according to claim 14, wherein the barrier member (50) comprising an orifice member (201).

16. The centrifuge (1) for separating intermixed particulate material according to claim 11, wherein the centrifuge (1) is configured to have a pressure gradient in the annular cavity (31) along the outer surface of the centrifuge bowl wall that has a positive and a negative value.

17. The centrifuge (1) for separating intermixed particulate material according to claim 11, wherein a top flange (56) of the centrifuge bowl and a top flange (55) of the housing comprising at least partially overlapping openings, configured for de-silting the annular cavity (31) and allowing the annular cavity (31) to be in fluid communication with the surroundings, preferably wherein the centrifuge bowl top flange opening and/or the housing top flange opening comprise a de-silting nozzle (72).

* * * * *